W. STARK.
Potato Digger.
No. 80,841. Patented Aug. 11, 1868.
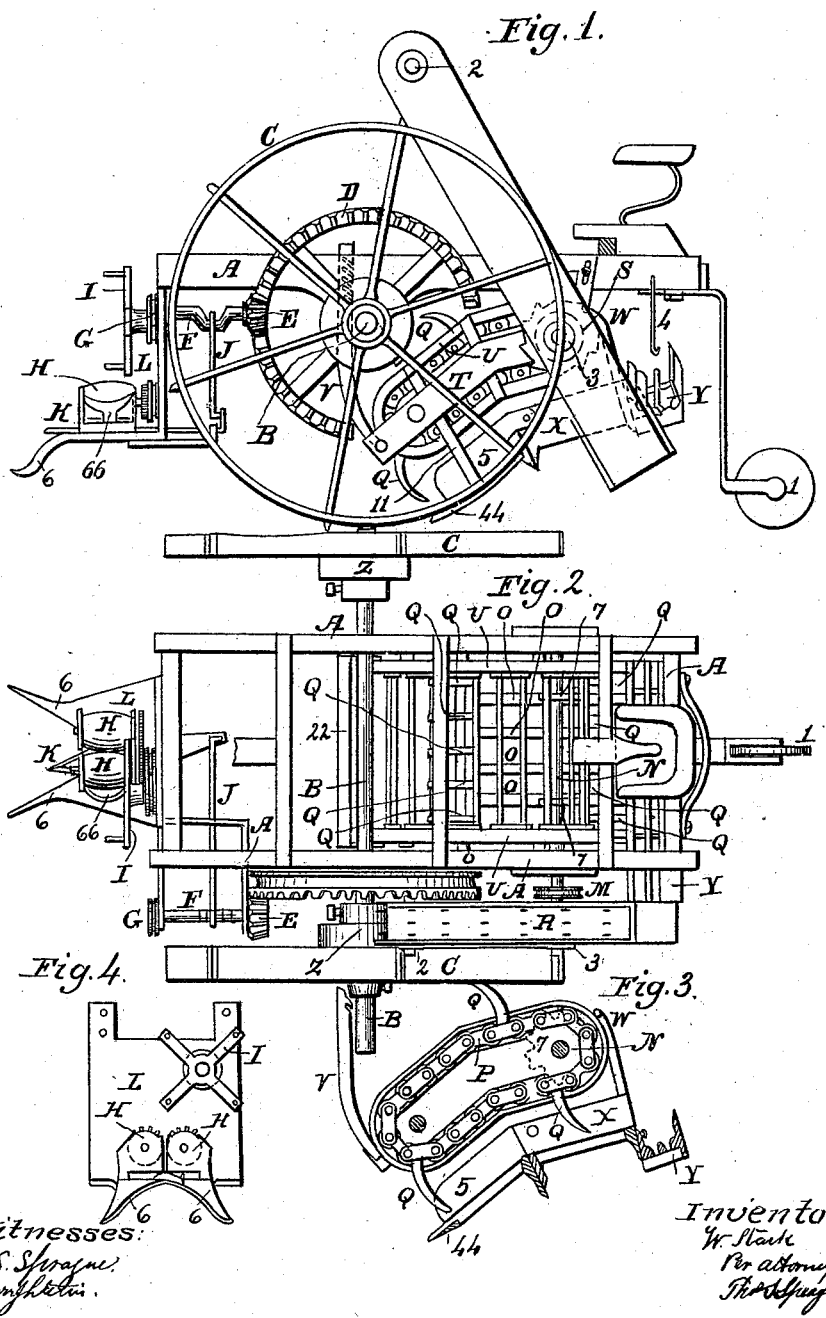

UNITED STATES PATENT OFFICE.

WILLIAM STARK, OF WHITE PIGEON, MICHIGAN.

IMPROVEMENT IN POTATO-DIGGERS.

Specification forming part of Letters Patent No. 80,841, dated August 11, 1868.

*To all whom it may concern:*

Be it known that I, WILLIAM STARK, of White Pigeon, in the county of St. Joseph and State of Michigan, have invented a new and useful Improvement in an Apparatus for Digging Potatoes; and I do hereby declare that the following is a true and accurate description thereof, reference being had to the accompanying drawings, and to the letters of reference marked thereon and being a part of this specification.

Figure 1 is a side view of the digger with a portion of wheel broken out. Fig. 2 is a top view. Fig. 3 is a detached section. Fig. 4 is a front view of a detached part.

Like letters indicate like parts in each figure.

The carriage of this apparatus consists of a rectangular frame, A, mounted upon wheels C 1 and axle B, on which are arranged the following-described parts of the machine: Rigidly secured to shaft B is wheel D, gearing with bevel-pinion E, secured to the end of crank-shaft F, giving motion to sickle-bar K through pitman J. At the rear end of shaft E is firmly secured belt-pulley G, giving motion to reel I and rollers H, all supported by plate L, to which are attached angling projecting arms 6 6. The lip or front edge of scoop 4 4 is provided with longitudinal grate-bars O O O O. The back section, X, of grate-bars is hinged to and supported by shoulders to the first or lower section, 5. The rear end of the back section is provided with arms W, terminating at their upper ends with right-angular projections, forming an escapement, with ratchet-wheels S, giving a vibrating motion to the grates, to which is attached at the rear end transverse-grated box Y, secured to the proper angles by rods 4 in position to discharge the potatoes in the foot of the elevator R, which is operated by belt from pulley 3 to pulley 2. The front end, scoop, and rakes suspended and adjusted by connecting-bars 11, hangers V, connected by bar 2 2, adjustable and secured in place by diagonal slots in hangers V, fitting and suspended by pins to the inside of the frame provided for that purpose. Shaft N obtains its motion by belt from pulley 8 to pulley M, operating rake-teeth Q, which are secured to endless chain P by the aid of cog-wheel 7. Wheel 1 is connected by a pivoted arm to the rear end of the machine for supporting the same.

Having thus described the different parts of the apparatus, I will proceed to describe the operation of the same.

The traction-wheels passing between and the machine over the rows of potatoes to be dug, the different parts operate as follows: Projecting arms 6 gather the vines in position for sickle-bar to cut them near the ground. Rollers H H clear the bar from vines, while the reel I moves the same to one side clear from the machine. After clearing the rows of vines, the scoop, passing under the potatoes, elevates the same from their bed, and are conveyed to the rear of the machine by curved arms Q, passing between the grate-bars, and by the vibrating motion of the rear section, X, of bars the soil is separated from the potatoes, the soil falling through simultaneously with the movement of potatoes to transverse-grated box Y in their passage to the elevator, which receives its motion by belt from pulley 3 to pulley 2. The elevator-belt R is provided with projecting hooks for retaining the potatoes and holding the same during their ascent to the top of the elevator, where they may be discharged in any receptacle prepared for the same. Collars Z, firmly secured on shaft B, are provided with spring-ratchets, allowing the apparatus to back up without rotating shaft B, wheels C being loosely placed on the shaft and secured by outside collars, the ratchets placed in collar Z corresponding and fitting with pawls in the hubs of the wheels for the purpose of allowing the machine to be backed up without endangering the machinery in the operation. The ends of shaft B extend some distance from the frame of the machine, which admits of the wheels being placed at different distances apart, according to the width of the rows between which the wheels are to traverse.

Spring 6 6, placed in position against one of the friction-rollers H, operates to keep the same (rollers H H) near together, for the purpose hereinbefore described.

I would mention that many varieties of potatoes—such as peach-blows, &c.—adhere strongly to the vines, so much so that they may be pulled from the earth by the vines, and in the process of gathering the same I would suggest the removal of sickle-bar K and allow the rollers to draw the potatoes by the vines, and separate the same by the potatoes being drawn off in the passage of the vines through the rollers. The angular frame U, to sustain the endless chain P, is suspended and held in position by the bars T, the forward ends of which are suspended to the axle B by means of the hangers V.

What I claim as my invention, and desire to secure by Letters Patent, is—

1. The angular transverse frame U, in combination with bars T, hangers V, connecting-bar 2 2, endless chain P, and arms Q, when operating for the purpose set forth.

2. Grated section X, in combination with grated scoop 5, box Y, escapement W, ratchet S, all operating as and for the purposes specified.

3. The combination of the above-named parts with elevator R, sickle-bar K, pitman J, crank-shaft F, reel I, rollers H, plate L, provided with angular projecting arms 6, when constructed, arranged, and operating substantially as and for the purposes herein set forth.

WILLIAM STARK.

Witnesses:
    LEVI SHIMMEL,
    GEORGE G. DE PUY.